United States Patent Office 3,158,272
Patented Nov. 24, 1964

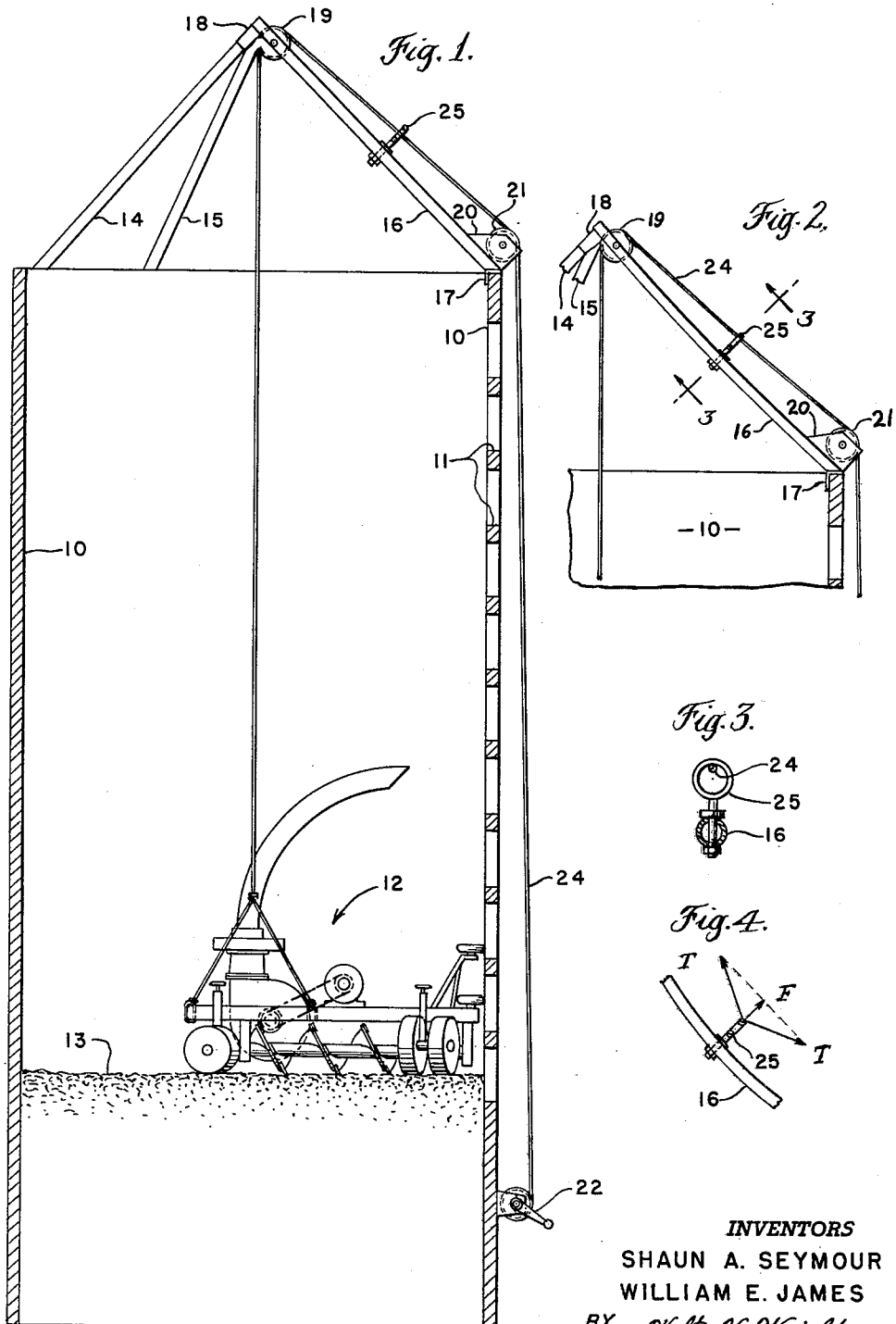

3,158,272
SILO UNLOADER SUSPENSION
Shaun A. Seymour, New Holland, and William E. James, Ephrata, Pa., assignors to Sperry Rand Corporation, New Holland, Pa., a corporation of Delaware
Filed Aug. 15, 1963, Ser. No. 302,294
3 Claims. (Cl. 214—17)

This invention relates generally to silo unloaders. More specifically, this invention relates to improvements in suspension apparatus for silo unloaders.

It is common, where silo unloaders are employed, to provide a support structure atop the silo and a cable and winch mechanism for raising and lowering the unloader within the silo. Whether the silo unloader is of the suspended type wherein the unloader as a unit is suspended from a cable at all times or of the non-suspended type wherein the unloader is normally supported on the surface of the column of silage, it is necessary to raise the unloader to the top of the silo in order to fill the silo.

A desirable support structure for use with silo unloaders is a simple tripod mounted on top of the silo wall with one leg of the tripod carrying a pair of pulleys, one at the central axis of the silo and one at the outer perimeter of the silo wall. The suspension cable may be run from the winch to the outside pulley, then to the inside pulley, and then down to the silo unloader. This arrangement, however, presents problems of uneven loading of the legs of the support structure and premature failure of the structure. While the use of additional braces or heavier structural members is a solution to the problem of mechanical failure, it undesirably complicates the already difficult and somewhat hazardous task of installing the support structure on top of a silo, as well as increasing the cost of the apparatus.

It is an object of this invention to provide silo unloader suspension apparatus of the utmost mechanical simplicity and low cost.

It is another object of this invention to provide silo unloader suspension apparatus having the combined characteristics of light weight and adequate strength.

It is another object of this invention to provide silo unloader suspension apparatus which, because of its mechanical simplicity and light weight, minimizes the effort and hazards normally associated with the installation of such apparatus.

It is another object of this invention to provide silo unloader suspension apparatus wherein the tensile strength of the supporting cable is employed to strengthen the pulley supporting structure.

It is the specific object of this invention to provide silo unloader suspension apparatus comprising a simple tripod support structure having central and outer pulleys carried on one leg thereof and to utilize the strength of the supporting cable for the dual purpose of suspending the silo unloader while simultaneously supplementing the strength of the pulley carrying leg of the support tripod.

These and other objects and advantages of this invention will be apparent upon reference to the following description and claims taken in conjunction with the accompanying drawing wherein:

FIG. 1 is a vertical sectional view of silo having a silo unloader machine therein suspended from apparatus constructed in accordance with the principles of the present invention;

FIG. 2 is a fragmentary view similar to FIG. 1 showing a portion of the support structure of the present invention under load;

FIG. 3 is an enlarged sectional view taken on the line 3—3 of FIG. 2; and

FIG. 4 is a digrammatic illustration of the transfer of force from the suspension cable to the pulley carrying leg of the tripod support structure.

Referring now to the drawing in detail, the numeral 10 indicates a conventional upright cylindrical walled silo having the usual vertical column of access openings 11. A silo unloader generally indicated by the reference numeral 12 is disposed within the silo on the surface of the column of silage 13 therein. The silo unloader rotates about the central vertical axis of the silo gathering material from the surface of the column of silage and conveying the gathered material out of the silo through the access openings 11 as is well known.

Since the type of silo shown is filled from the top, the silo unloader 12 must be raised to the top of the silo to avoid being buried under the new silage when the silo is re-filled. To accomplish this, a support structure having legs 14, 15 and 16 is provided at the top of the silo. Each of the legs has means, such as the bracket 17 shown at the lower end of leg 16, mounting one end of the leg on the silo wall. A tripod bracket 18 interconnects the other ends of the legs 14, 15 and 16 above the top of the silo and substantially on the central vertical axis of the silo. The support leg 16 is bifurcated at its upper end and has a pulley 19 journalled in the bifurcation. As may be seen in FIG. 1, the axis of rotation of pulley 19 is horizontal. A pair of up-standing flanges 20 (one visible) are mounted on the upper side of leg 16 at the lower end of the leg. Another pulley 21 is journalled for rotation about a horizontal axis between the flanges 20.

A winch 22 is mounted on the silo wall near the ground and preferably in vertical alignment with pulleys 21 and 19. So far as the present invention is concerned, the winch 22 could be mounted anywhere between the position shown in FIG. 1 and the position of pulley 21 shown in FIG. 1. The winch need not be mounted directly under pulley 21 if additional cable guides are provided to keep the cable in alignment with pulley 21 at the pulley. If a power winch is employed, it may be installed at the lower end of leg 16 in place of pulley 21 with the electrical control switch mounted near the ground for ready access by an operator on the ground. A suspension cable 24 has one end connected to winch 22. The cable 24 extends upwardly from winch 22 to and around pulley 21, then upwardly and inwardly along the upper side of leg 16 of the support structure to and around pulley 19, and then downwardly substantially on the central vertical axis of the silo to the silo unloader 12. The other end of cable 24 is supportingly connected, in any suitable manner, to the silo unloader 12.

It will be seen from the above that manual operation of winch 22 will effect raising and lowering of the silo unloader 12 within the silo.

The above described structure is desirable and more or less conventional. For a better understanding of the present invention it is necessary to consider the problems associated with silo unloader suspension apparatus of the above described type.

It will be apparent from FIGS. 1 and 2, that the particular leg 16 of the tripod support structure carries more of the load of silo unloader 12 than the other legs 14 and 15. In actual practice, the column load on leg 16 is more than twice the column load on companion legs 14 and 15. The tension on cable 24, which equals the weight of silo unloader 12, acts from left to right in FIG. 1 about pulley 19. This lifts weight off legs 14 and 15 and adds it to leg 16. It also applies a moment to leg 16 attempting to pivot that leg clockwise about mounting bracket 17 and bend, or buckle, the leg. Thus, the leg 16 is overstressed, so to speak.

The silo unloader shown in FIG. 1 is of the non-suspended type wherein the weight of the unloader is only on cable 24 when the unloader is raised off the surface of the silage. In the case of a suspended silo unloader, wherein the weight of the unloader is on the cable at all times, the uneven loading of the tripod legs is present all the time. It will be appreciated from the above that failure of the support structure almost always occurs in leg 16. Attempts to solve this problem have taken the obvious course of employing braces or heavier structural members as tripod legs. This increases the cost of the support structure as well as the difficulty of installation atop a silo.

In accordance with the present invention, a simple eye support 25 is bolted or welded to leg 16 substantially midway between pulleys 19 and 21. The eye support 25 extends upwardly from leg 16 and has cable 24 threaded therethrough. As may be seen in FIG. 4, the tension T of cable 24 transfers force F through support 25 to tripod leg 16 when the cable is under tension and the leg 16 is deflected sufficiently to bring eye 25 into engagement with cable 24. This supplements the strength of leg 16 in resistance to bending under load. The above arrangement enables the use of lighter more economical and more easily installable support legs at negligible additional cost to the support structure.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Apparatus for suspending a silo unloader within a silo having an upright cylindrical wall, said apparatus comprising a support structure at the top of said silo wall and having at least three support legs, means mounting one end of each of said support legs on said silo wall, means connecting the other ends of said legs together above and substantially equidistant from said one ends of said legs, a pulley mounted on one of said legs at said other end thereof, winch means mounted adjacent said silo wall in a vertical plane common to said one of said support legs and below said pulley, a cable having sufficient tensile strength to support a silo unloader, said cable having one end connected to said winch means and the other end supportingly connected to said silo unloader, said cable extending upwardly from said winch means along the upper side of said one of said support legs to and around said pulley and then downwardly within said silo to said silo unloader, the weight of said silo unloader on said cable acting through said pulley to exert force on said one of said supporting legs attempting to bend said leg when said unloader is suspended on said cable, and means carried by said one support leg intermediate the ends thereof and engaging said cable to apply tension force from said cable resulting from the weight of said silo unloader to said one leg in a direction to oppose bending of the leg.

2. Apparatus for suspending a silo unloader within a silo having an upright cylindrical wall, said apparatus comprising a support structure at the top of said silo wall and having at least three support legs, means mounting one end of each of said support legs on said silo wall, means connecting the other ends of said legs together above and substantially equidistant from said one ends of said legs, a first pulley mounted at said one end of one of said legs, a second pulley mounted on said one of said legs at said other end thereof, winch means mounted below the top of said silo wall, a cable having sufficient tensile strength to support a silo unloader, said cable having one end connected to said winch means and the other end supportingly connected to said silo unloader, said cable extending upwardly from said winch means to and around said first pulley then upwardly along said one support leg to and around said second pulley and then downwardly within said silo to its other end at said silo unloader, the weight of said silo unloader on said cable acting through said pulleys to exert force on said one of said support legs attempting to bend said leg when said unloader is suspended on said cable, and means carried by said one support leg intermediate said first and second pulleys and engaging said cable to apply tension force from said cable resulting from the weight of said silo unloader to said one leg in a direction to oppose bending of the leg.

3. Apparatus for suspending a silo unloader within a cylindrical wall silo having a vertical central axis, said apparatus comprising a support structure at the top of said silo wall and having three support legs of substantially equal length, means connecting one end of each of said three legs to the top of said wall at substantially equally spaced points around the perimeter of the wall, means connecting the other ends of said three legs together at a point substantially on the vertical central axis of the silo and above the top of said silo wall, a first pulley, means mounting said first pulley on one of said legs at said one end of the leg for rotation about a generally horizontal axis, a second pulley, means mounting said second pulley on said one of said legs at said other end of the leg for rotation about a generally horizontal axis, a winch mounted on said silo wall near the bottom of the wall on the outside of the silo and in vertical alignment with said first pulley, a cable having one end anchored to said winch, said cable extending upwardly from said winch to and around said first pulley then upwardly and inwardly along the upper side of said one leg to and around said second pulley and then downwardly within said silo substantially on the central vertical axis of the silo and having its other end supportingly connected to a silo unloader inside the silo, said cable having sufficient tensile strength to raise and lower said silo unloader within the silo upon operation of said winch, the weight of said silo unloader on said cable acting through said pulleys to exert force on said one of said supporting legs attempting to bend said leg when said unloader is supported on said cable, and support means mounted on said one of said legs substantially mid-way between the ends of the leg, said support means extending upwardly from the leg and engaging said cable to apply tension force from the cable resulting from the weight of said silo unloader to the mid point of said one leg in a direction to resist bending of said one leg from the load imposed thereon by the weight of said silo unloader.

References Cited by the Examiner
UNITED STATES PATENTS 1,467,662 9/23 Van Aalst.
2,995,260 8/61 McCann et al. _____ 214—17.84

HUGO O. SCHULZ, Primary Examiner.